United States Patent [19]
Mogi et al.

[11] Patent Number: 4,751,574
[45] Date of Patent: * Jun. 14, 1988

[54] ELECTRONIC APPARATUS CONTROL SYSTEM

[75] Inventors: Takao Mogi; Masayuki Suematsu, both of Tokyo; Kosuke Fujita, Kanagawa, all of Japan

[73] Assignee: Sony Corporation, Tokyo, Japan

[*] Notice: The portion of the term of this patent subsequent to May 10, 2005 has been disclaimed.

[21] Appl. No.: 831,875

[22] Filed: Feb. 24, 1986

[30] Foreign Application Priority Data

Mar. 5, 1985 [JP] Japan .................................. 60-43383

[51] Int. Cl.[4] .............................................. H04N 7/04
[52] U.S. Cl. .................................. 358/147; 359/194.1
[58] Field of Search ............... 358/147, 146, 142, 188, 358/903, 194.1, 191.1; 455/186

[56] References Cited

U.S. PATENT DOCUMENTS

| 4,338,632 | 7/1982 | Falater . | |
|---|---|---|---|
| 4,380,027 | 4/1983 | Leventer et al. | 358/147 |
| 4,649,428 | 3/1987 | Jones et al. | 358/194.1 |

FOREIGN PATENT DOCUMENTS

2539260  1/1984  France .

OTHER PUBLICATIONS

"Microprocessor Adds Flexibility to Television Control System", by Kaare Karstad Electronics, vol. 52, #2, pp. 132–138, 11/79.
"Electronics" Magazine, Aug. 11, 1981, Digital VLSI Breeds Next-Generation TV Receivers.
"Electronics Engineering", Jan. 1984, Small Area Networks Using Serial Data Transfer.

*Primary Examiner*—Edward L. Coles, Sr.
*Assistant Examiner*—David E. Harvey
*Attorney, Agent, or Firm*—Lewis H. Eslinger; Jay H. Maioli

[57] ABSTRACT

A control system for an electronic apparatus, such as a television receiver, having a control circuit with a control program in an internal memory sequentially communicates over an internal bus within predetermined intervals, such as within the vertical blanking interval of the television signal, with a plurality of controllable circuits in the television receiver, and the control circuit operates to select and communicate with a specific, selected one of the controllable circuits first, in each predetermined interval, with the remainder of the controllable circuits being subsequently communicated with in the remaining portion of the vertical blanking interval.

5 Claims, 4 Drawing Sheets

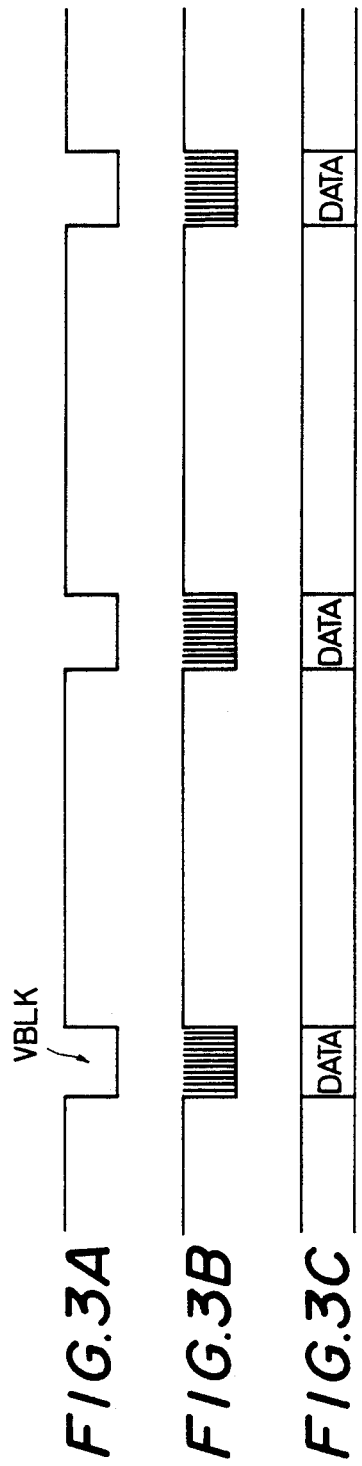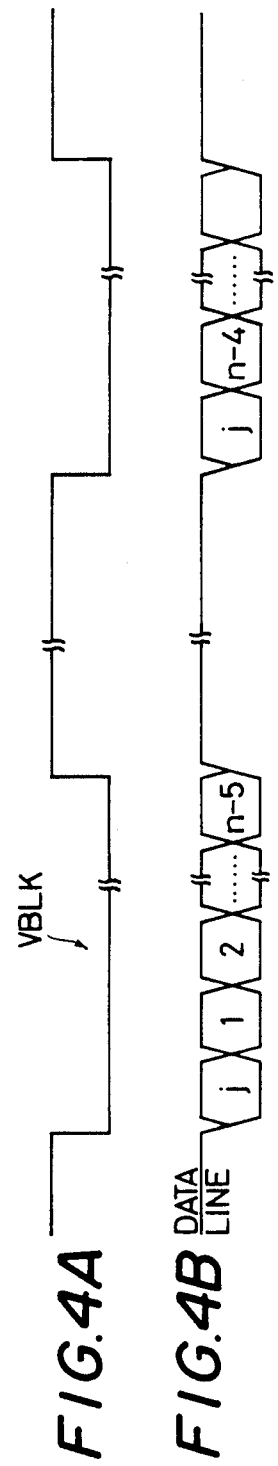

ELECTRONIC APPARATUS CONTROL SYSTEM

BACKGROUND OF THE INVENTION

1. Field of the Invention

This invention relates generally to a control system for controlling electronic apparatus and, particularly, to a control system that is adapted to digitally control internal circuitry of video and audio equipment.

2. Description of the Background

Video and audio equipment, such as TV receivers, video tape recorders, and audio tape recorders, that include digital control circuitry are becoming quite prevalent. This kind of digital control circuitry typically employs a microprocessor arrangement and utilizes an internal or inner system bus to facilitate communication between the microprocessor and the various functional blocks of the particular piece of equipment. Generally, when employing the internal bus, a central processing unit (CPU), a read only memory (ROM), and the like are incorporated, which communicate by means of the bus. Operational preset data for each of the various functional circuits is stored in the read only memory and, in normal operation, the preset data is read out from the read only memory under control of the central processing unit. The data so read out from the read only memory is supplied to a predetermined controllable circuit, such as the video processor in a television receiver through the internal bus, so as to permit that particular circuit to perform a predetermined operation. In this approach employing an internal bus, typically each operational system can also be selectively controlled by the central processing unit upon actuation of an external unit, such as a keyboard or remote control unit. The internal bus used in this kind of system can use various communication schemes, such as that disclosed in Japanese Patent Application No. 57/106262, in which the bus line is a two-wire bus comprised of a data line and a clock line.

In addition, video and audio equipment employing the above-described internal bus system is also advantageously adapted to undergo adjustment procedures during manufacture and maintenance or repair using the control circuitry already in place by connection through a jack or by remote control interface. This permits both standardization of the adjustments of the circuitry, as well as simplification thereof, and leads to overall cost reductions both during manufacture and repair.

Typical of the units employed in a television receiver that may be controlled in such a system are the audio processing circuit, video control circuit, video processor, deflection control circuit, and the tuning circuit. Subsequently, when the television receiver receives control commands fed by the remote control commander or manual keyboard, the central processing unit controls the specific controllable circuit in response to the commands, which might involve tuning, volume adjustment, picture adjustment, and the like.

During the control operation of the various kinds of equipment under discussion here, when the control signals are fed from the main central processing unit to the specific controllable circuits, data representing the control or state contents of the signal are transmitted together with clock signals. In such situation, it has been found that when the clock signal frequency is increased, radio frequency interference due to noise from the clock pulses will appear on the cathode ray tube of the particular piece of apparatus. Accordingly, it is known to avoid such display noise and to transmit data only during the vertical blanking interval of the video signal.

This transmission of data during the vertical blanking interval has led to the following problem. Because the vertical blanking interval provided for data transmission has only a time interval of 1.17 to 1.33 milliseconds, when data is transmitted in this interval using clock signals having a frequency of 100 kHz, only approximately 117-bytes of data can be transmitted during one vertical blanking interval. Therefore, when 1 byte of data is transmitted with a 1-bit acknowledge bit, then only 13-bytes (117÷9) can be transmitted.

Therefore, it can be seen that the amount of data that may be transmitted during one vertical blanking interval is severely limited and, thus, the number of communications that can be achieved between the main central processing unit and the various controllable circuits is also limited. Moreover, when the wait time and the like is considered, in some cases the main central processing unit may not be able to check the operational states of all of the controllable circuits within a single vertical blanking interval. In that case, the central processing unit is forced to check the various circuits in the next successive vertical blanking interval and this can result in an unacceptably long response time in the particular piece of equipment.

OBJECTS AND SUMMARY OF THE INVENTION

Accordingly, it is an object of the present invention to provide a system for controlling electronic apparatus that can eliminate the above-noted defects inherent in the prior art.

It is another object of this invention to provide a control system for an electronic apparatus in which a main control circuit and a selected one of a number of controllable circuits communicate with each other in each predetermined time interval immediately after the start of such interval.

It is a further object of this invention to provide a control system for electronic apparatus of the kind that utilizes a television signal, wherein communication between a main control circuit and a plurality of controllable circuits is performed only during a vertical blanking interval of the television signal.

It is still another object of the present invention to provide a control system for an electronic apparatus of the kind operating on television signals, wherein a control circuit and a plurality of controllable circuits are interconnected through a two-wire bus.

Still another object of this invention is to provide a control system for use with a television receiver that has an external connection to receive channel selection and operational control information.

In accordance with an aspect of the present invention, a control system is provided for use with electronic apparatus such as a television receiver, wherein a control circuit has a control program in a read only memory that sequentially communicates with the plurality of the operational circuits in the electronic apparatus through a bus within predetermined intervals and the control circuit selects a specific controllable circuit to communicate with first in each predetermined interval. If all of the controllable circuits cannot be communicated with in one such interval, the next successive interval is awaited before resuming communication.

The above and other objects, features, and advantages of the present invention will become apparent from the following detailed description of illustrative embodiments thereof to be read in conjunction with the accompanying drawings, in which like reference numerals represent the same or similar elements.

BRIEF DESCRIPTION OF THE DRAWINGS

FIGS. 3A to 3C are waveform diagrams useful in explaining signal transmission in a two-wire bus to which the present invention is applicable;

FIG. 4A and 4B are waveform diagrams useful in explaining a mode of operation of an embodiment of the present invention.

DETAILED DESCRIPTION OF PREFERRED EMBODIMENTS

Figure 1:
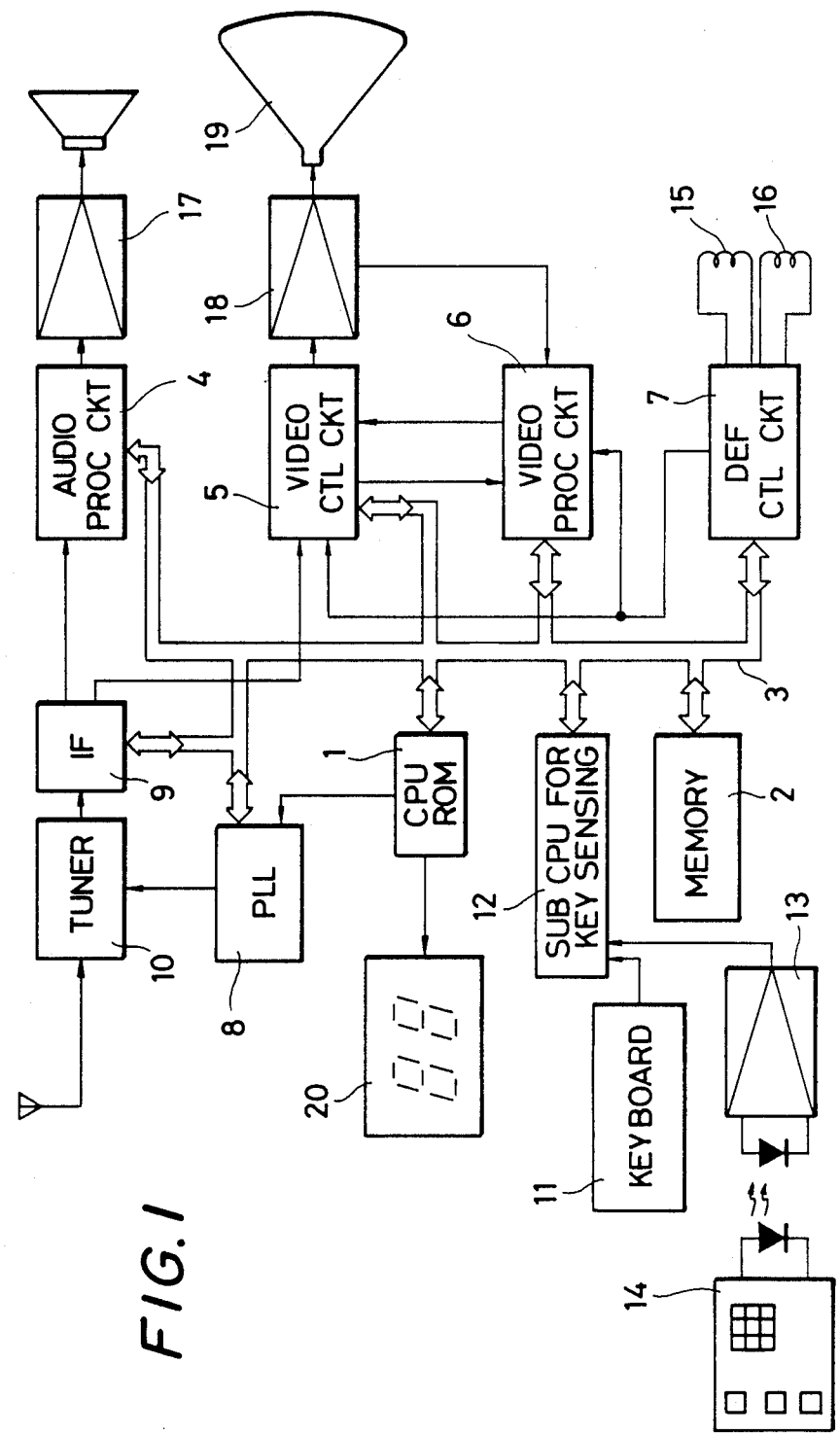
FIG. 1 is a schematic in block diagram form of a television receiver employing an internal bus adapted for use with the present invention.

FIG. 1 is a block diagram representation of a television receiver of the kind employing an internal bus to which the present invention is applicable. More particularly, the television receiver employs a central processing unit 1 that has a control program in an internal read only memory, a main memory 2, and an internal bus 3. In this television receiver, the various controllable circuits include an audio processing circuit 4, a video control circuit 5, a video processing circuit 6, a deflection control circuit 7, a phase-lock loop (PLL) circuit 8, and an intermediate frequency (IF) circuit 9. Various commands can be provided to central processing unit 1 from a keyboard 11 that communicates through a sub-central processing unit 12, which is used for key sensing, that is, key decoding, via internal bus 3. Also provided to generate commands is a remote control signal receiving circuit 13 that operates in conjunction with a remote control commander 14, with the remote control receiver circuit being connected to sub-CPU 12 for ultimate communication with central processing unit 1 via bus 3. By means of these command input units 11 and 14, central processing unit 1 controls circuits 4 through 9 so that control operations such as tuning, volume adjustment, picture adjustment and the like can be efficiently provided. The adjustment result can be displayed to the user by a display section 20. In addition to the adjustment function, main central processing unit 1 serves to constantly check the operational state of the various controllable circuits in order to assure that they operate in the correct predetermined states. In addition to the standard elements described above contained within a television receiver, a television receiver as in FIG. 1 also typically employs deflection coils 15 and 16, an audio output amplifier 17, a video output amplifier 18, and a cathode ray tube 19, which are indirectly controlled by central processor 1.

Figure 2:
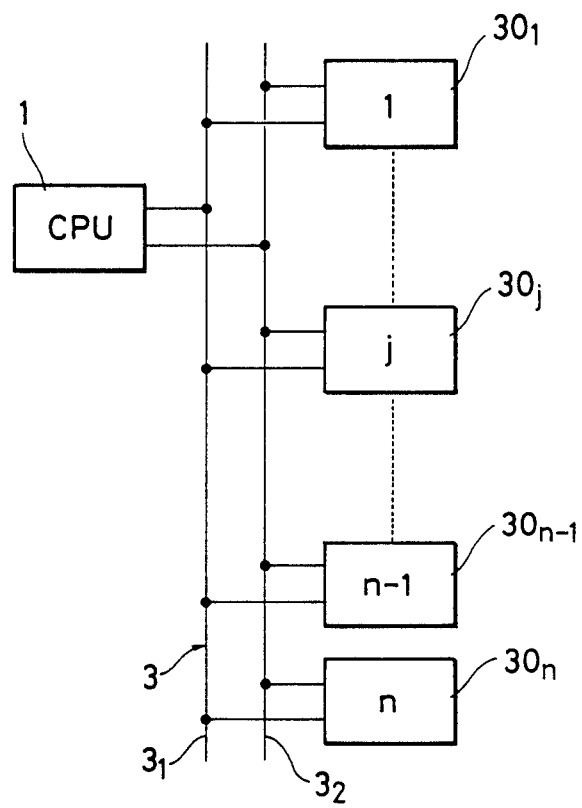
FIGS. 2 is a schematic in block diagram form useful in explaining a mode of operation of the present invention.

FIG. 2 depicts a control circuit represented by main CPU 1 connected to a plurality of controllable circuits $30_1$ to $30_n$ through two-wire bus 3, which consists of a clock line $3_1$ and a data line $3_2$. In this two-wire bus system, clock pulses are transmitted on clock line $3_1$ and data is transmitted over data line $3_2$, with a timing relationship represented in FIGS. 3A through 3C. More particularly, Fig. 3A represents the vertical scan signal showing the vertical blanking interval VBLK as the low level portion, and it is only during this vertical blanking interval that clock pulses are transmitted over clock line $3_1$, as shown in Fig. B. Similarly, only during the vertical blanking interval is data transmitted over data line $3_2$, as shown in FIG. 3C.

In this embodiment, control of a specific controllable circuit, for example, circuit $30_j$ of FIG. 2, is performed first at the instant each vertical blanking interval starts. The vertical blanking intervals are represented in FIG. 4A on a larger scale than in FIG. 3A, and it can be seen from FIG. 4B that a data interval j, which indicates data communication with circuit $30_j$, is provided first. Subsequent communication intervals 1, 2, ... n for the other circuits $30_1$ to $30_n$, excluding interval $30_j$, are then accommodated within the vertical blanking interval. Typically, however, there are so many controllable circuits that all of them cannot be accommodated within a single vertical blanking interval and, thus, following the first interval that includes the initial data block to communicate with the selected controllable unit $30_j$, the remaining controllable units are accommodated in the subsequent vertical blanking interval after circuit $30_j$ has been communicated with. FIG. 4B shows the data interval for circuit $30_j$ occurring first in the second vertical blanking interval, and this indicates that even if all other circuits have not yet been communicated with circuit $30_j$ has priority for data transfer. If this is not necessary, then circuit (n–4) can be first in the next interval, for example. Moreover, there may be so many controllable units $30_1 \ldots 30_n$ that even two vertical blanking intervals are not sufficient within which to provide communication with all of the controllable units and three or even more vertical blanking intervals can be utilized as needed before all of the controllable circuits are communicated with, however, circuit $30_j$ should be first in each vertical blanking interval. The box-like portions represented in the vertical blanking intervals in FIG. 4B represent communication intervals to respective ones of the specific controllable circuits, indicated by the letters and numerals in the boxes.

Furthermore, a specific controllable circuit that is controlled at first in each vertical blanking interval, need not be a single circuit such as $30_j$, but can comprise two or more such circuits, in which case a corresponding number of communication intervals are then dedicated in each vertical blanking interval. Additionally, communication with a specific controllable circuit need not be performed within every vertical blanking interval, as seen in FIG. 4B, but could be performed at every other vertical blanking interval or at any other predetermined sequence of vertical blanking intervals.

Practically speaking, a circuit that requires a particularly fast response is selected as the specific controllable circuit represented generally at $30_j$. For example, in the case of a television receiver, as represented in block diagram form in FIG. 1, optimum effect is obtained if control is performed with priority in response to requests from the keyboard and the remote control commander. In the case of selection of a number of specific controllable circuits that are to be first controlled in the television receiver shown in FIG. 1, for example, the phase-lock loop circuit 8, IF circuit 9, video control circuit 5, video processing control circuit 6, all represent suitable circuits that would have some priority and, thus, could be selected to be controlled first.

Figure 5:
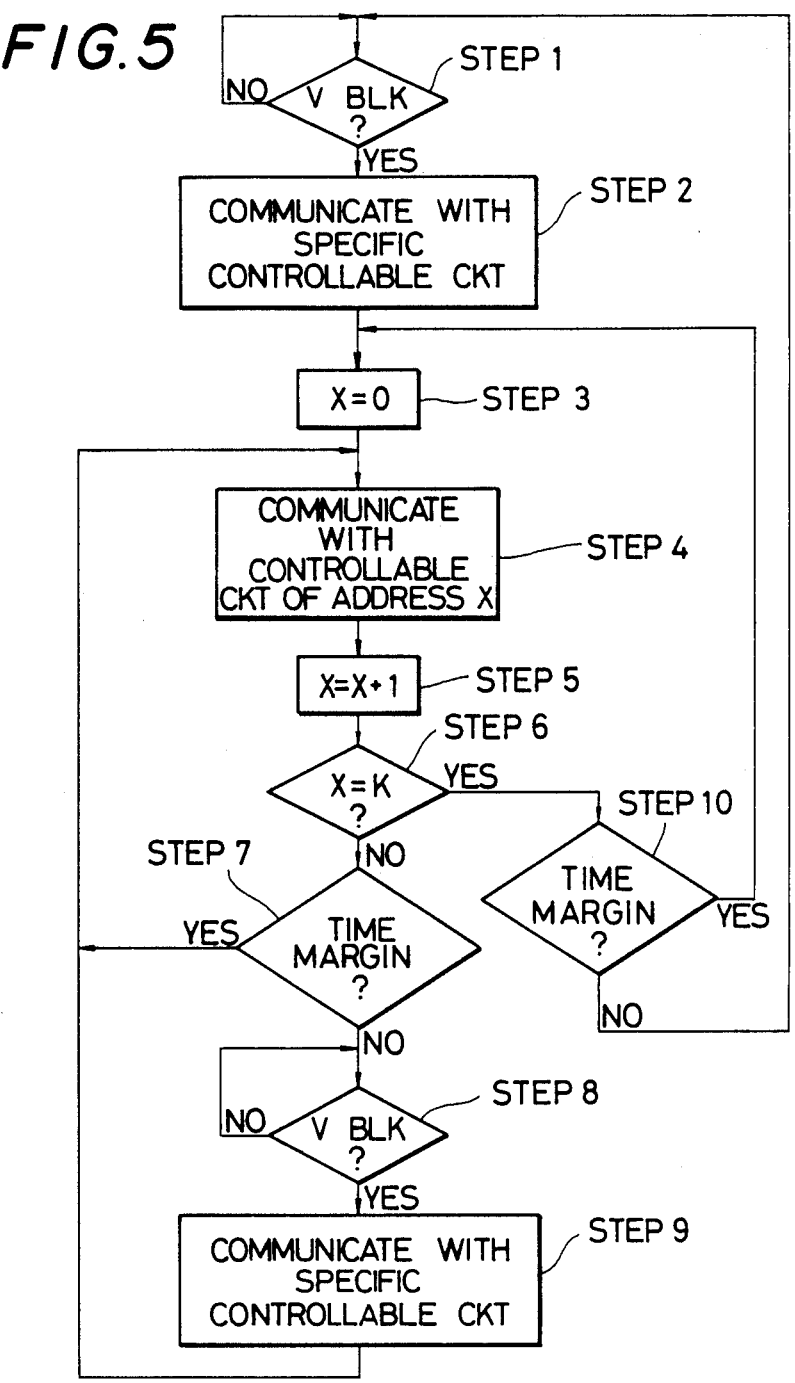
FIG. 5 is a flow chart useful in explaining a mode of operation according to an embodiment of the present invention.

FIG. 5 is a flow chart that provides communication between the control circuit and the several controllable circuits according to an embodiment of the present invention. More particularly, in step 1 it is determined whether the vertical blanking interval has arrived and, if so, communication with the specific circuit selected as $30_j$ is performed in step 2. After such communication with circuit $30_j$ an address parameter X is initialized by setting it equal to zero in step 3, and then communication with the controllable circuit $30_n$ that corresponds to address X is performed in step 4. After such communication has terminated, the address parameter X is incremented by one (X +1) in step 5 and then in step 6 it is checked whether that addresss is equal to a predetermined value K. This value K would typically represent the total number of controllable units $30_1 \ldots 30_n$ in the system. In that case, if it is determined that the address parameter X does equal the predetermined value K then that means the end of the communication cycle. Therefore, when it has been determined that the address does equal the predetermined value K, it is then determined in step 10 whether there is some time margin remaining for further communication. If there is no time margin remaining, then the procedure returns to initial step 1 and the next occurring vertical blanking interval is awaited. If there is time remaining, as determined in step 10, the procedure can then return to step 3 at which point the address parameter X is again initialized to zero and the method advances to step 4. If it is determined in step 6 that the address parameter X has not yet reached predetermined value K, then it is checked to see whether any time margin is remaining in the vertical blanking interval and, if so, the method can return to step 4, in which the controllable circuit having that address is again communicated with.

If, however, in step 7 it is determined that there is no time remaining, then it is necessary to await the next vertical blanking interval in step 8 and when the next vertical blanking interval is reached, then communication with the specific controllable circuit $30_j$ is performed in step 9 and the the method returns to step 4.

Therefore, it can be seen from the above according to the present invention that in video equipment, such as television receivers and video tape recorders or the like employing an internal bus system, any one of the plurality of controllable circuits within such apparatus that requires a particularly fast response can be controlled or monitored with priority over the other controllable circuits in the video equipment. Thus, efficient communication can be achieved among the various controllable units even though communication is performed only during vertical blanking intervals.

Although illustrative embodiments of the invention have been described in detail herein with reference to the accompanying drawings, it is to be understood that the invention is not limited to such precise embodiments and that various changes and modifications can be effected therein by one skilled in the art without departing from the spirit and scope of the invention, as defined in the appended claims.

What is claimed is:

1. A control system for television apparatus having a plurality of controllable operational circuits that control the functioning of the television apparatus, comprising:

a control circuit including a control program stored in a memory;

an internal bus system connected between said control circuit and said plurality of controllable operational circuits; and in which said control circuit includes means for transmitting data over said bus system to said controllable operational circuits sequentially during vertical blanking intervals of a television signal, means for selecting at least one of said controllable operational circuits to the exclusion of remaining ones of said plurality of controllable circuits for said transmitting of data thereto first, at a time immediately after the start of each of said vertical blanking intervals, means for determining whether all of said remaining ones have had data transmitted thereto during the vertical blanking interval in which is transmitted to said selected controllable circuit and, if not, enabling said means for transmitting to cause the latter to transmit data to said remaining ones in a next successive vertical blanking interval, with data transmitted to said selected one of said controllable operational circuits first in said successive vertical blanking interval.

2. A control system according to claim 1, in which said internal bus system includes a clock line and a data line.

3. A control system according to claim 2, in which said television apparatus is a television receiver and further comprising a remote control unit for providing channel selection control signals for said televeision receiver.

4. A method of controlling television apparatus employing a central control circuit including a stored control program for controlling a plurality of controllable operational circuits that control the functioning of the television apparatus by data transmission over an internal bus system, comprising the steps of:

selecting one of the plurality of controllable operational circuits to have data transmitted thereto before data is transmitted to any other of said plurality of controllable operational circuits;

selecting seccessive vertical blanking intervals of a television signal for the data transmission;

performing data transmission to said selected controllable operational circuit first during each vertical blanking interval; and performing data transmission to remaining ones of said controllable operational circuits to which data has not been transmitted during the remainder of each of said vertical blanking intervals.

5. A method according to claim 4, in which the step of performing data transmission to remaining ones of said controllable operational circuits comprises the further step of determining whether all of the remaining ones of said controllable operational circuits have had data transmitted thereto during the vertical blanking interval in which data is transmitted to said selected controllable circuit and, if not, transmitting data to said remaining ones to which data has not been transmitted in a next successive vertical blanking interval after transmitting data to said selected one of said controllable operaitonal circuits first in said successive vertical blanking intrval.

* * * * *

UNITED STATES PATENT AND TRADEMARK OFFICE
CERTIFICATE OF CORRECTION

PATENT NO. : 4,751,574
DATED : June 14, 1988
INVENTOR(S) : Takao Mogi et al

It is certified that error appears in the above-identified patent and that said Letters Patent is hereby corrected as shown below:

Column 6, line 45, "secessive" should read --successive--;

line 65, "operaitonal" should read --operational--;

line 66, "intrval" should read --interval--.

Signed and Sealed this

Fourteenth Day of February, 1989

Attest:

DONALD J. QUIGG

*Attesting Officer*     *Commissioner of Patents and Trademarks*